(12) United States Patent
Lee et al.

(10) Patent No.: US 6,595,749 B2
(45) Date of Patent: Jul. 22, 2003

(54) TURBINE AIRFOIL AND METHOD FOR MANUFACTURE AND REPAIR THEREOF

(75) Inventors: Ching-Pang Lee, Cincinnati, OH (US); Lawrence Joseph Roedl, West Chester, OH (US); Jonathan James Stow, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 35 days.

(21) Appl. No.: 09/940,812

(22) Filed: Aug. 28, 2001

(65) Prior Publication Data

US 2002/0187044 A1 Dec. 12, 2002

Related U.S. Application Data

(63) Continuation-in-part of application No. 09/867,213, filed on May 29, 2001.

(51) Int. Cl.[7] .................................................. F01D 5/18
(52) U.S. Cl. ...................... 416/97 R; 416/224; 416/241; 415/173.1
(58) Field of Search ................................ 416/97 R, 228, 416/224, 241; 415/173.1, 173.4, 174.4

(56) References Cited

U.S. PATENT DOCUMENTS

| | | | |
|---|---|---|---|
| 3,899,267 A | 8/1975 | Dennis et al. ................. 416/92 |
| 4,390,320 A | 6/1983 | Eiswerth .................... 416/97 R |
| 4,540,339 A | 9/1985 | Horvath et al. ................ 416/92 |
| 5,183,385 A | 2/1993 | Lee et al. .................. 416/97 R |
| 5,261,789 A | 11/1993 | Butts et al. ................ 416/96 R |
| 5,348,446 A | 9/1994 | Lee et al. ................. 416/241 R |
| 5,584,663 A | * 12/1996 | Schell et al. ............. 416/241 R |
| 5,673,745 A | * 10/1997 | Jackson et al. ................ 164/80 |
| 5,738,491 A | * 4/1998 | Lee et al. .................... 415/177 |
| 5,743,322 A | * 4/1998 | Jackson et al. ................ 164/98 |
| 5,794,338 A | 8/1998 | Bowden, Jr. et al. ...... 29/889.1 |
| 5,846,057 A | * 12/1998 | Ferrigno et al. ......... 416/241 R |
| 5,937,946 A | * 8/1999 | Streetman .................... 166/267 |
| 6,059,530 A | 5/2000 | Lee .......................... 416/97 R |
| 6,074,602 A | * 6/2000 | Wukusick et al. ........... 420/443 |
| 6,164,914 A | 12/2000 | Correia et al. ............. 416/97 R |
| 6,231,307 B1 | 5/2001 | Correia ..................... 416/97 R |
| 6,299,971 B1 | * 10/2001 | Maloney .................. 428/312.8 |
| 6,344,382 B1 | * 2/2002 | Wu et al. .................... 438/220 |

\* cited by examiner

*Primary Examiner*—Edward K. Look
*Assistant Examiner*—James M McAleenan
(74) *Attorney, Agent, or Firm*—David L. Narciso; Pierce Atwood

(57) ABSTRACT

An airfoil for a gas turbine engine, the airfoil having a core body with an airfoil body, an integral partial height squealer tip defining a tip shelf, and an integral tip cap between the airfoil body and the integral partial height squealer tip; and a squealer tip extension bonded to the partial height squealer tip. A method for manufacture and repair of an airfoil.

28 Claims, 3 Drawing Sheets

TURBINE AIRFOIL AND METHOD FOR MANUFACTURE AND REPAIR THEREOF

CROSS REFERENCE TO RELATED APPLICATIONS

This application is a continuation-in-part of application Ser. No. 09/867,213 filed May 29, 2001.

BACKGROUND OF THE INVENTION

This invention relates to airfoils for gas turbine engines and more particularly to airfoils with cast-in tip caps, airfoils with impingement cooled squealer tips, bimetallic airfoils, and methods for making and repairing airfoils.

Airfoils in gas turbine engines experience durability problems at the tip of the airfoil in the form of cracking due to thermally induced stress and material loss due to oxidation. This can be addressed by using an alloy having increased resistance to environmental oxidation and corrosion. However, it is undesirable to upgrade the entire airfoil to a more thermal-resistant and oxidation-resistant alloy because this increases component cost and perhaps weight.

Bowden, Jr. et al., U.S. Pat. No. 5,794,338 discloses a blade originally manufactured with a one-piece body of a single superalloy which is removed from service after being damaged. The blade tip is repaired by removing damaged alloy material and replacing it with a different alloy more resistant to environmental oxidation.

Lee et al., U.S. Pat. No. 5,348,446 discloses an airfoil having a core body of a first alloy and a U-shaped blade tip of a second alloy bonded to a flat roof of the core body.

Tip wear has also been addressed by increasing cooling efficiency at the tip. Various cooling arrangements are disclosed in Lee et al. U.S. Pat. No. 5,183,385, including impingement cooling of the squealer tip via angled impingement cooling holes in a brazed-on tip cap. Dennis et al., U.S. Pat. No. 3,899,267 discloses an alternative impingement cooling arrangement. One deficiency of the prior art cooling arrangements, wherein the full length of the squealer tip is cast integrally with the tip cap and the core body, is that angle impingement cooling holes cannot be drilled into the tip cap because the full height of the squealer tip interferes with the line of sight for drilling cooling holes. This problem is further exacerbated in a design having a tip shelf, in which the tip cavity is relatively narrow in comparison to a design not having a tip shelf.

BRIEF SUMMARY OF THE INVENTION

Briefly, therefore, the invention is directed to an airfoil having a one-piece core body having, upon original manufacture, an airfoil body, an integral partial height squealer tip, a tip shelf formed at the junction of the airfoil body and the partial height squealer tip, an integral tip cap between the airfoil body and the integral partial height squealer tip, and a squealer tip extension bonded to the partial height squealer tip.

The invention is also directed to an airfoil having a one-piece core body formed from a first superalloy comprising, upon original manufacture, an airfoil body and an integral tip cap. There is also a squealer tip bonded to the core upon original manufacture and having at least a portion thereof formed from a second superalloy distinct from the first superalloy. A tip shelf is formed at the junction of the airfoil body and the squealer tip. The second superalloy comprises, by approximate weight percent, 0.1 to 0.15 C, 6.0 to 7.0 Cr, 0.01 to 0.02 B, 5.5 to 6.5 Al, 2.5 to 3.5 Re, 4.5 to 5.5 W, 1 to 2 Mo, 11 to 13 Co, 6 to 7 Ta, 1 to 2 Hf, and the balance Ni.

In another aspect the invention is an airfoil comprising a one-piece core body having an airfoil body, an integral partial height squealer tip, a tip shelf formed at the junction of the airfoil body and the partial height squealer tip, and an integral tip cap between the airfoil body and the integral partial height squealer tip. There is a squealer tip extension bonded to the partial height squealer tip, cooling holes in the integral tip cap which holes are angled to direct cooling toward the squealer tip extension.

The invention is further directed to an airfoil manufactured by forming a one-piece core body comprising an airfoil body, an integral partial height squealer tip, a tip shelf formed at the junction of the airfoil body and the partial height squealer tip, and an integral tip cap between the airfoil body and the integral partial height squealer tip; by drilling a cooling hole in the tip cap which cooling hole is angled to direct cooling at the squealer tip extension; and by bonding a squealer tip extension to the partial height squealer tip.

In another aspect the invention is an airfoil of the type having an airfoil body, a tip cap, a squealer tip, and a tip shelf formed at the junction of the airfoil body and the squealer tip, which airfoil is repaired by removing at least a portion of the squealer tip, drilling an impingement cooling hole in the tip cap which cooling hole is angled so as to provide impingement cooling, and replacing the at least a portion of the squealer tip.

The invention is also a method for manufacturing a gas turbine engine airfoil of the type having an airfoil body, a tip cap having a film cooling hole therein, a squealer tip, and a tip shelf formed at the junction of the airfoil body and the squealer tip. The method is forming a one-piece core body comprising an airfoil body, an integral partial height squealer tip, and an integral tip cap between the airfoil body and the integral partial height squealer tip; and bonding a squealer tip extension to the partial height squealer tip.

The invention is additionally directed to a method for repairing a gas turbine engine airfoil of the type having an airfoil body, a tip cap, a squealer tip, and a tip shelf formed at the junction of the airfoil body and the squealer tip. The method involves removing at least a portion of the squealer tip, drilling an impingement cooling hole in the tip cap which cooling hole is angled so as to provide impingement cooling, replacing the at least a portion of the squealer tip.

The present invention and its advantages over the prior art will become apparent upon reading the following detailed description and the appended claims with reference to the accompanying drawings.

DETAILED DESCRIPTION OF THE INVENTION

Figure 1:
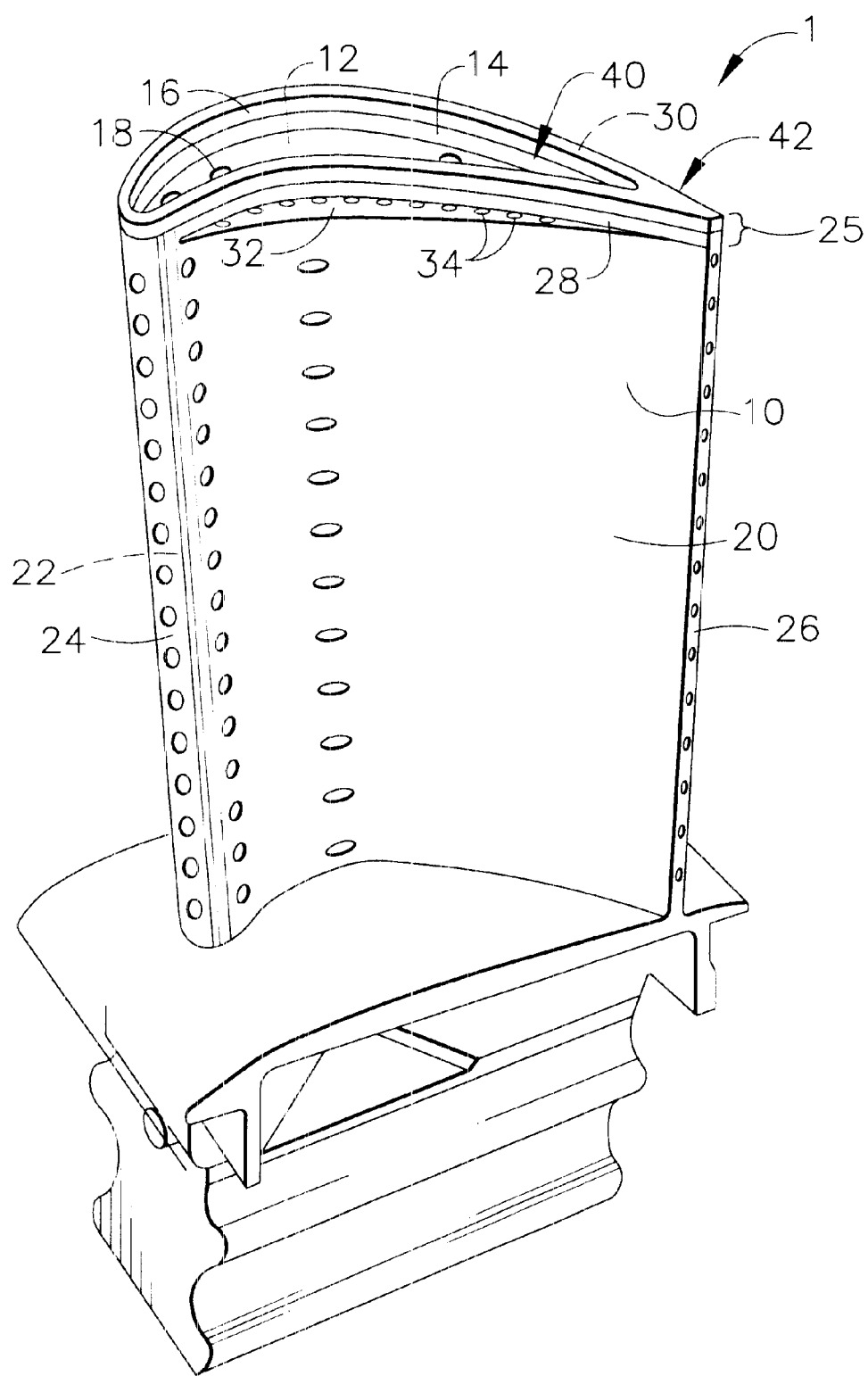
FIG. 1 is a perspective view of a gas turbine engine airfoil.
Figure 2:
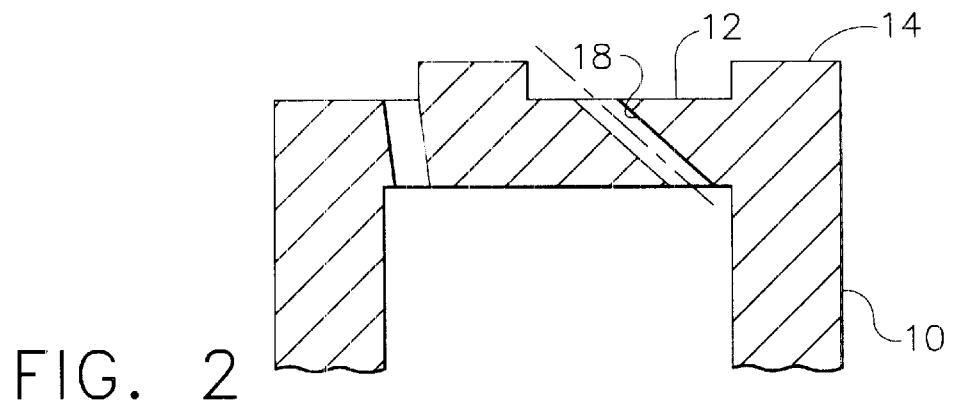
FIG. 2 is a schematic sectional view of a partially manufactured gas turbine engine airfoil.
Figure 3:
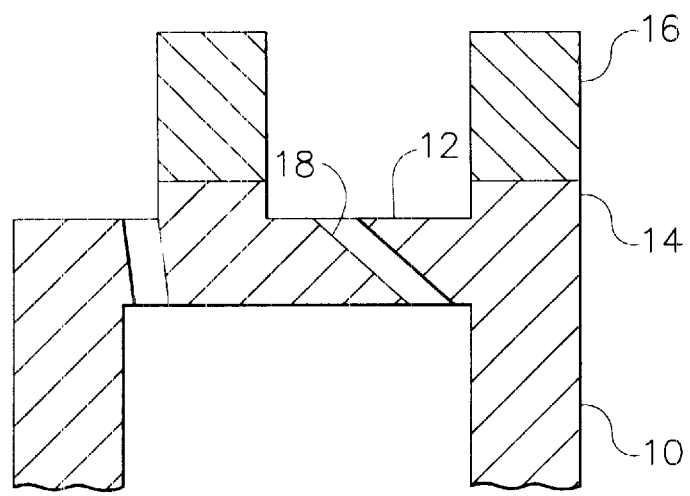
FIGS. 3 and 4 are schematic sectional views of a gas turbine engine airfoils.

The invention as shown in FIGS. 1, 2 and 3 comprises an airfoil 1 having a leading edge 24, a trailing edge 26, a concave or pressure side 20, and a convex or suction side 22.

The airfoil 1 has a core body which includes an airfoil body 10, integral cast-in tip cap 12, and an integral partial height cast-in squealer tip 14. There is also a squealer tip extension 16 which extends upwardly from the cast-in squealer tip.

In manufacturing the airfoil, an airfoil body 10, tip cap 12, and partial height squealer tip 14 are integrally formed in a single casting as shown in FIG. 2. These form a one-piece core body having an airfoil body, an integral partial height squealer tip 14, and an integral tip cap 12 between the partial height squealer tip and the airfoil body. Impingement cooling holes 18 are then drilled as by laser drilling or other method into the tip cap 12. The cooling holes 18 are at an angle so as to be directed above the termination of the partial-height squealer tip 14 as shown by dashed line in FIG. 2. The impingement cooling holes provide enhanced cooling of the pressure-side squealer tip wall, especially in combination with a tip shelf as described more fully below.

The squealer tip extension 16 is bonded to the partial height squealer tip 14 as shown in FIG. 3. The extension may be formed by weld build up or may be a separate casting which is attached by welding, diffusion bonding, or other technique. The squealer tip extension 16 extends only upwardly, as distinguished from the U-shaped component in, e.g., Horvath, U.S. Pat. No. 4,540,339, which lays over the cast-in tip cap in that patent. An advantage to the current configuration versus the '339 configuration is that the current configuration weighs less, because it does not have the effective double tip cap of the '339 configuration.

As shown FIG. 1, the airfoil 1 includes an improved tip 42 similar to that shown and described in Butts et al, U.S. Pat. No. 5,261,789. More specifically, the squealer tip 25, which is comprised partly by the partial-height squealer 14 and partly by the squealer extension 16, includes a pressure-side wall 28 and a suction-side wall 30. The suction side wall 30 is spaced at least in part from the pressure-side wall 28 to define therebetween a radially outwardly facing, open tip plenum 40.

As shown in FIG. 1, the pressure-side wall 28 is preferably recessed at least in part from the airfoil pressure side 20 for improving cooling of the tip 42. The pressure-side wall 28 is recessed from the airfoil pressure side 20 toward the airfoil suction side 22 to define a radially outwardly facing tip shelf 32 which extends generally between the leading and trailing edges 24 and 26. The recessed pressure side wall 28 and the shelf 32 define therebetween a generally L-shaped trough 36 (shown in FIG. 4). In one possible configuration, the tip shelf 32 is imperforate except for a plurality of cooling holes 34 extending through the tip shelf 32 in flow communication between an interior cooling air channel 44 of the blade and the trough 36 for channeling a portion of the cooling air into the trough 36 for cooling the tip 42.

Figure 4:
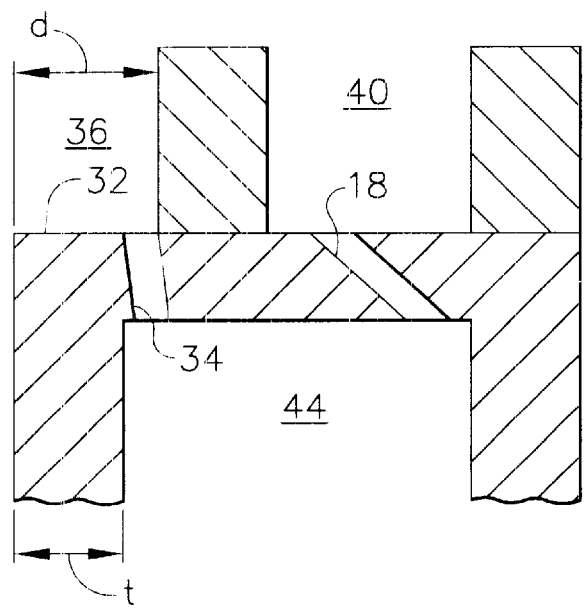

Referring to FIG. 4, the tip shelf 32 has a depth d. The depth is preferably about the size of the wall thickness t of the airfoil pressure side 20, but may be varied, for example the depth may be increased in order to provide room for increased film cooling coverage of pressure side wall 28, as shown in FIG. 4.

More specifically, and referring to FIG. 4, the cooling holes 34 discharge cooling air into the trough 36 on the airfoil pressure side 20. The trough 36 provides at least two improved functions: the shelf 32 provides a discontinuity in the airfoil pressure side 20 to cause the combustion gases to separate from the surface thereof as they flow over the pressure side wall 28 which decreases the heat transfer capability thereof, and therefore decreases the heat flux into the pressure-side wall 28; and the trough 36 provides a region for the cooling air to accumulate to provide a film cooling blanket of cooling air between the combustion gases and the pressure-side wall 28 which, therefore, further protects the pressure-side wall 28 from the combustion gases while also providing cooling thereof.

Cooling of the tip is further enhanced by the inclusion of angled tip cap holes 18 (FIG. 4). The tip cap holes 18 are angled in a circumferential direction so as to direct cooling air to impinge directly on the pressure-side wall 28 of the squealer tip. The combination of improved film cooling from the presence of the tip shelf 32 and impingement cooling from the angled tip cap holes 18 produces very effective cooling for the tip 42 and results in lower tip temperature without the use of additional cooling air flow.

One of the advantages of the present invention is illustrated in FIGS. 2 and 3. By having a partial height squealer tip cast-in rather than a full height squealer tip, there is a line of sight for drilling angled impingement cooling holes, as shown by the dashed line in FIG. 2. The technical effect of this is that efficient impingement cooling is imparted to the tip, as described above. Furthermore, there is flexibility to form the squealer tip extension 16 from the same alloy as the rest of the blade, or from a different alloy.

A feature of this invention is that the tip cap is cast-in rather than brazed-on. By casting the tip cap in the body, the further manufacturing operation of brazing as well as brazing surface preparation is avoided. Also, a further joint and its corresponding durability problems are avoided. The invention here of a partial height squealer tip and a separate tip extension advantageously has the technical effect of facilitating the incorporation of the brazed-on tip cap advantage of permitting angled impingement cooling holes into a design which does not have the drawbacks of a brazed-on tip cap.

One aspect of this invention is the manufacture of at least a portion of the squealer tip from an alloy (a second superalloy) having enhanced resistance to the more extremely oxidative and corrosive conditions encountered by the airfoil tip, relative to the resistance of the alloy (a first superalloy) from which the core body is formed. Examples of advantageous combinations are as follows (nominal compositions in weight percent):

| Combination 1 | |
| --- | --- |
| Body (Rene' 125) | Tip (Rene' 142) |
| C 0.1 | C 0.1–0.15 |
| Cr 9 | Cr 6.0–7.0 |
| Ti 2.5 | Ti <1 |
| B 0.01 | B 0.01–0.02 |
| Al 4.8 | Al 5.5–6.5 |
| | Re 2.5–3.5 |
| W 7 | W 4.5–5.5 |
| Mo 2.5 | Mo 1–2 |
| Co 10 | Co 11–13 |
| Zr 0.05 | Zr 0–0.03 |
| | Cb 0–0.5 |
| | Y 0–0.5 |
| Ta 3.5 | Ta 6–7 |
| Hf 1.5 | Hf 1–2 |
| | V <1 |
| Ni Balance | Ni Balance |
| Combination 2 | |
| Body (Rene' 80) | Tip (Rene' 142) |
| C 0.15–0.2 | C 0.1–0.15 |
| Cr 13.5–14.5 | Cr 6.0–7.0 |
| Ti 4.5–5.5 | Ti <1 |

-continued

|                |                |
| -------------- | -------------- |
| B 0.01–0.02    | B 0.01–0.02    |
| Al 2.5–3.5     | Al 5.5–6.5     |
| Ti:Al 1:1–2:1  |                |
|                | Re 2.5–3.5     |
| W 3.5–4.5      | W 4.5–5.5      |
| Mo 3.5–4.5     | Mo 1–2         |
| Co 7.5–12.5    | Co 11–13       |
|                | Ta 6–7         |
|                | Hf 1–2         |
| Zr 0.005–0.1   | Zr 0–0.03      |
|                | Cb 0–0.5       |
|                | Y 0–0.5        |
| Ni Balance     | Ni Balance     |

RENE is a registered trademark owned by Teledyne Industries, Inc. of Los Angeles, Calif., USA.

Figure 5:
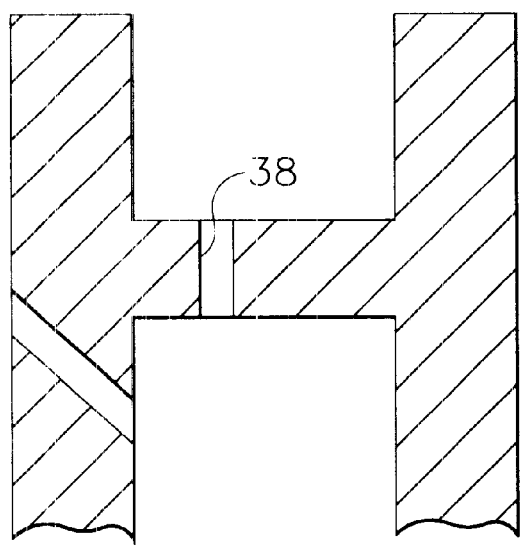
FIG. 5 is a prior art airfoil shown schematically and in section.
Figure 6:
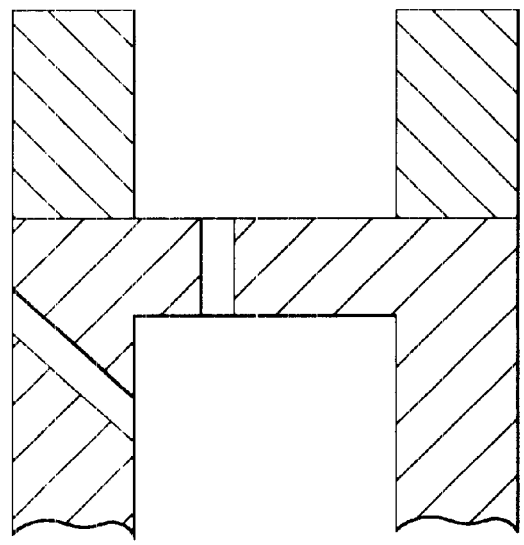
FIG. 6 is a prior art airfoil after a repair operation, shown schematically and in section.

It is known to repair damaged blades as shown in FIGS. 5 and 6 by removing all or a portion of a squealer tip and replacing it with a tip of a second alloy more resistant to oxidation and corrosion. However, there are significant advantages to incorporating this second superalloy into the tip of the airfoil upon original manufacture, as opposed to upon repair as shown in FIGS. 5 and 6, or as described in U.S. Pat. No. 5,749,338. In particular, the technical effect of this increase in tip durability upon original manufacture is a reduction in the number of cracks during operation. This increases the repair yield, and reduces the number of components which are irreparably damaged in their first service tour after original manufacture. Also, because oxidative and corrosive deterioration are reduced, tip clearance due to oxidation will be reduced, which results in increased service time between engine removals due to performance degradation attributable to tip clearance.

A further advantage to manufacturing the tip from a second superalloy is that, as compared to modifying the alloy of the entire airfoil, modifying only the tip alloy results in much less of a weight change, thus minimizing or eliminating concerns about how weight changes affect vibration frequencies or the disk life.

The invention is shown in FIGS. 2 and 3 with a partial height, for example, roughly one-fifth as shown in this particular embodiment, of the squealer tip height formed from the same alloy as the airfoil body and only an extension on the squealer tip formed from a different alloy. In the embodiment shown in FIG. 4, the portion of the squealer tip formed from the second alloy is much greater than half, with as much as the entirety of the squealer tip above the tip cap formed from the second alloy.

In one embodiment the invention involves repairing a blade originally manufactured with a film-cooled tip cap. A portion or all of the squealer tip is removed. The film cooling holes in the tip cap, which extend in a radial direction, like the tip cap hole 38 in FIG. 5, are welded closed or otherwise permanently plugged. New impingement cooling holes like 18 in FIGS. 2 and 3 are drilled, facilitated by partial or complete removal of the squealer tip. And a new squealer tip or squealer tip extension is attached, either as a separate casting which is attached by diffusion bonding, welding, or other technique, or as weld build up.

The foregoing has described a turbine blade having a separate tip and a tip shelf to improve cooling. While specific embodiments of the present invention have been described, it will be apparent to those skilled in the art that various modifications thereto can be made without departing from the spirit and scope of the invention as defined in the appended claims.

What is claimed is:

1. An airfoil for a gas turbine engine comprising:
    a one-piece core body formed from a first superalloy, said core body comprising an airfoil body, an integral partial height squealer tip, a tip shelf formed at the junction of said airfoil body and said partial height squealer tip, an integral tip cap between the airfoil body and the integral partial height squealer tip; and
    a squealer tip extension bonded to the partial height squealer tip.

2. The airfoil of claim 1 wherein the squealer tip extension is formed from a same superalloy as the one-piece core body.

3. The airfoil of claim 2 further comprising cooling holes in the integral tip cap, which holes are angled to direct cooling exiting said holes toward the squealer tip extension.

4. The airfoil of claim 1 wherein the squealer tip extension is formed from a second superalloy distinct from the first superalloy.

5. The airfoil of claim 4 further comprising cooling holes in the integral tip cap, which holes are angled to direct cooling exiting said holes toward the squealer tip extension.

6. An airfoil for a gas turbine engine comprising:
    a one-piece core body formed from a first superalloy, said core body comprising an airfoil body, an integral tip cap; and
    a squealer tip bonded to the core body so as to define a tip shelf at the junction of said core body and said squealer tip, said squealer tip having at least a portion thereof formed from a second superalloy distinct from the first superalloy, the second superalloy comprising, by approximate weight percent, 0.1 to 0.15 C, 6.0 to 7.0 Cr, 0.01 to 0.02 B, 5.5 to 6.5 Al, 2.5 to 3.5 Re, 4.5 to 5.5 W, 1 to 2 Mo, 11 to 13 Co, 6 to 7 Ta, 1 to 2 Hf, and the balance Ni.

7. The airfoil of claim 6 further comprising a partial height squealer tip disposed between the core body and the at least a portion of the squealer tip comprising the second superalloy, the partial height squealer tip being formed integrally with the core body.

8. The airfoil of claim 7 wherein the first superalloy comprises, by approximate nominal weight %, 0.1 C, 9 Cr, 2.5 Ti, 0.01 B, 4.8 Al, 7 W, 2.5 Mo, 10 Co, 3.5 Ta, 1.5 Hf.

9. The airfoil of claim 7 wherein the first superalloy comprises, by approximate weight %, 0.15 to 0.2 C, 13.5 to 14.5 Cr, 4.5 to 5.5 Ti, 0.01 to 0.02 B, 2.5 to 3.5 Al, 3.5 to 4.5 W, 3.5 to 4.5 Mo, 7.5 to 12.5 Co, and the balance Ni.

10. The airfoil of claim 6 wherein the first superalloy comprises, by approximate nominal weight %, 0.1 C, 9 Cr, 2.5 Ti, 0.01 B, 4.8 Al, 7 W, 2.5 Mo, 10 Co, 3.5 Ta, 1.5 Hf.

11. The airfoil of claim 6 wherein the first superalloy comprises, by approximate nominal weight %, 0.15 to 0.2 C, 13.5 to 14.5 Cr, 4.5 to 5.5 Ti, 0.01 to 0.02 B, 2.5 to 3.5 Al, 3.5 to 4.5 W, 3.5 to 4.5 Mo, 7.5 to 12.5 Co, and the balance Ni.

12. An airfoil for a gas turbine engine comprising:
    a one-piece core body formed from a first superalloy, said core body comprising an airfoil body, an integral partial height squealer tip, a tip shelf formed at the junction of said airfoil body and said partial height squealer tip, an integral tip cap between the airfoil body and the integral partial height squealer tip;
    a squealer tip extension bonded to the partial height squealer tip; and
    cooling holes in the integral tip cap which holes are angled to direct cooling exiting said holes toward the squealer tip extension.

13. The airfoil of claim 12 wherein the squealer tip extension is formed from a same superalloy as the one-piece core body.

14. The airfoil of claim 12 wherein the squealer tip extension is formed from a second superalloy distinct from the first superalloy.

15. An airfoil for a gas turbine engine manufactured by a method comprising:

forming a one-piece core body comprising an airfoil body, an integral partial height squealer tip, a tip shelf formed at the junction of said airfoil body and said partial height squealer tip, and an integral tip cap between the airfoil body and the integral partial height squealer tip;

bonding a squealer tip extension to the partial height squealer tip; and drilling a cooling hole in the tip cap which cooling hole is angled to direct cooling at the squealer tip extension.

16. The airfoil of claim 15 wherein the method comprises drilling the cooling hole prior to the bonding of the squealer tip extension to the partial height squealer tip.

17. An airfoil for a gas turbine engine of the type having an airfoil body, a tip cap, and a squealer tip, and a tip shelf formed at the junction of said airfoil body and said squealer tip, the airfoil having been repaired by a method comprising:

removing at least a portion of the squealer tip;

drilling an impingement cooling hole in the tip cap which cooling hole is angled so as to provide impingement cooling; and replacing said at least a portion of the squealer tip.

18. The airfoil of claim 17 wherein the tip cap comprises a film cooling hole prior to repair and the method comprises plugging the film cooling hole.

19. A method for manufacturing a gas turbine engine airfoil of the type having an airfoil body, a tip cap having a film cooling hole therein, a squealer tip, and a tip shelf formed at the junction of the airfoil body and the squealer tip, the method comprising:

forming a one-piece core body comprising an airfoil body, an integral partial height squealer tip, a tip shelf formed at the junction of said airfoil body and said partial height squealer tip, and an integral tip cap between the airfoil body and the integral partial height squealer tip; and bonding a squealer tip extension to the partial height squealer tip.

20. The method of claim 19 comprising drilling a cooling hole in the tip cap prior to bonding the squealer tip extension to the partial height squealer tip, which cooling hole is angled so as to direct cooling at the squealer tip extension.

21. The method of claim 19 comprising forming the core body from a first superalloy and forming the squealer tip extension from a second superalloy distinct from the first superalloy.

22. The method of claim 19 comprising forming the squealer tip extension by welding build up onto the partial height squealer tip.

23. The method of claim 19 wherein the squealer tip extension is formed prior to attachment to the partial height squealer tip and is attached thereto by metallurgical bonding.

24. A method for repairing a gas turbine engine airfoil of the type having an airfoil body, a tip cap, a squealer tip, and a tip shelf formed at the junction of said squealer tip and said airfoil body, the method comprising:

removing at least a portion of the squealer tip;

drilling an impingement cooling hole in the tip cap which cooling hole is angled so as to provide impingement cooling; and replacing said at least a portion of the squealer tip.

25. The method of claim 24 wherein the gas turbine engine has a film cooling hole in the tip cap prior to repair, the method comprising plugging the film cooling hole.

26. The method of claim 24 wherein the replacing comprises building up by welding.

27. The method of claim 26 comprising plugging the film cooling hole prior to the drilling of the impingement cooling hole.

28. The method of claim 27 wherein the replacing comprises building up by welding with a second superalloy distinct from a first superalloy from which the airfoil is formed.

\* \* \* \* \*